3,149,146
α-CYANO-2-ALKENOXY-1-NAPHTHALENE-
ACRYLIC ACID ESTERS
Albert F. Strobel, Delmar, and Sigmund C. Catino, Castleton, N.Y., assignors to General Aniline & Film Corporation, New York, N.Y., a corporation of Delaware
No Drawing. Filed Mar. 9, 1960, Ser. No. 13,712
11 Claims. (Cl. 260—465)

This invention relates to new and useful α-cyano-2-alkenoxy-1-naphthaleneacrylic acid esters and to processes for preparing same.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will cause them to spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency problem may not be paramount.

We have discovered a class of compounds which are not only compatible with a great number of film-forming plastics, resins, gums, waxes and the like, but which, further, exhibit outstanding ultra-violet absorbing properties within the generally encountered ultra-violet region of 250 to 400 millimicrons. The compounds of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile.

It is therefore an object of the present invention to provide new and useful compounds characterized by outstanding ultra-violet absorbing properties.

It is a further object of this invention to provide new and useful 2 - alkenoxy - α - cyano-1-naphthaleneacrylic esters.

It is a still further object of this invention to provide new and useful 2-alkenoxy-α-cyano-1-naphthaleneacrylic esters exhibiting outstanding ultra-violet properties.

It is another object of this invention to provide processes for the preparation of new and useful ultra-violet absorbing compounds.

It is still another object of this invention to provide processes for the preparation of new and useful 2-alkenoxy-α-cyano-1-naphthalenacrylic esters.

Other objects and advantages will appear hereinafter as the description proceeds.

The new and useful compounds of this invention are characterized by the following general formula:

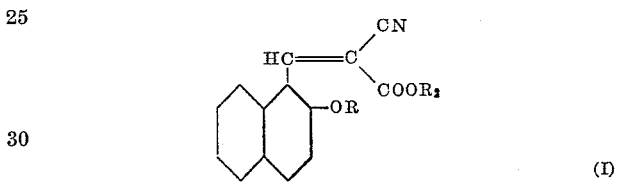

(I)

wherein $R_1$ is alkenyl of 3 to 20 carbon atoms such as allyl, methallyl, crotyl, butenyl-(1), pentenyl-(1), γ-isopropyl allyl, β-ethyl γ-propyl allyl, decenyl-(2), dodecenyl-(2), phytyl, etc. and $R_2$ is alkyl, hydroxy alkyl, halo alkyl, cyano alkyl, alkoxy alkyl, hydroxy alkoxy alkyl, carbalkoxy alkyl, alkenyl, aryl substituted aryl, hetero and the like.

The following specific substituents for $R_2$ may be employed in the above generic formulation:

Methyl
Ethyl
n-Propyl
Iso-propyl
n-Butyl
Iso-butyl
Hexyl
Decyl
Lauryl
Stearyl,
and the like
Cyanoethyl
Cyanopropyl (N-propyl, isopropyl)
Cyanobutyl (N-butyl, isobutyl, etc.)
Cyanoamyl
Cyanohexyl
Cyanodecyl
Cyanolauryl,
and the like.
Hydroxyethyl
Hydroxypropyl (N-propyl, isopropyl)
Hydroxybutyl (N-butyl, isobutyl, etc.)
Hydroxyamyl Hydroxyhexyl
Hydroxydecyl
Hydroxylauryl,
and the like.
Chloroethyl
Chloropropyl (N-propyl, isopropyl)
Chlorobutyl (N-butyl, isobutyl, etc.)
Chloroamyl
Chlorohexyl
Chlorodecyl
Chlorolauryl,
and the like.
Bromoethyl
Bromopropyl (N-propyl, isopropyl)
Bromobutyl (N-butyl, isobutyl, etc.)
Bromoamyl
Bromohexyl
Bromodecyl
Bromolauryl,
and the like.
Methoxyethyl
Methoxypropyl (N-propyl, isopropyl)
Methoxybutyl (N-butyl, isobutyl, etc.)
Methoxyamyl
Methoxyhexyl
Methoxydecyl
Methoxylauryl,
and the like.
Ethoxyethyl
Ethoxypropyl (N-propyl, isopropyl)
Ethoxybutyl (N-butyl, isobutyl, etc.)
Ethoxyamyl
Ethoxyhexyl
Ethoxydecyl
Ethoxylauryl,
and the like.
Polyhydroxyalkyls, e.g., glyceryl
Heterocyclics:
  Furyl
  Tetrahydrofurfuryl
  Benzofuryl
  thienyl
  pyrryl
  Pyrollidyl
  2-pyrollidonyl
  Indolyl
  Carbazolyl
  Oxazolyl
  Thiazolyl
  Pyrazolyl
  Pyridyl
  Pyrimidyl
  Quinolyl,
  and the various alkyl, alkoxy, halo, hydroxyalkyl, carboxy, carboalkoxy, acyl, and acylamino derivatives of the aforementioned heterocyclic radicals
Aryls:
  Phenyl
  α-Naphthyl, β-naphthyl
  α-Anthracyl, β-anthracyl, γ-anthracyl
  Cumyl
  Phenanthranyl
  Anisyl
  Phenetyl
  Tolyl
  p-Ethoxyphenyl
  1-methoxy phenanthryl
  β-Naphthyl methyl ether
  β-Naphthyl ethyl ether
  Hydroxyethyl phenyl
  Hydroxypropyl phenyl
  p-Hydroxyethyl naphthyl
  Chlorophenyl
  Bromophenyl
  1,2-dichlorophenyl
  1,3-dichlorophenyl
  1,3,5-trichlorophenyl
  1,2-dibromophenyl
  o-Chlorotolyl
  m-Chlorotolyl
  m-Bromotolyl
  Bromo-o-xylyl
  α,β-Dichloro naphthyl
  4-bromoacenaphthyl
  Carboxyphenyl
  Carboxytolyls
  Carboxyxylyls
  Carbalkoxylphenyls, e.g.:
    Carbomethoxylphenyl
    Carboethoxyphenyl
  Carbalkoxytolyls, e.g.:
    Carbomethoxytolyls
  Acetophenyl
  Propiophenyl
  Butyrophenyl
  Lauroylphenyl
  p-Acetotolyl
  Benzoyl naphthyl
  Acetaminophenyl
  Acet-methylamino phenyl
  Acetoaminotolyls
  Acetoaminonaphthyls
  Propio-aminophenyl
  Propio-aminotolyls
  Propio-aminonaphthyls
  Butyroaminophenyl In addition, $R_2$ may represent a substituent of the formula:

$$R_3X$$

wherein X is Formula I devoid of the $R_2$ substituent and $R_3$ is a bridging group which may be alkylene, substituted alkylene, arylene, substituted arylene or heterocyclic, e.g., —CH$_2$CH$_2$—
—CH$_2$CH$_2$CH$_2$—
—CH$_2$CH$_2$CH$_2$CH$_2$—
—CH$_2$CH$_2$CH$_2$CH$_2$CH$_2$—

(1)

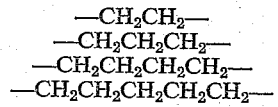

(2)

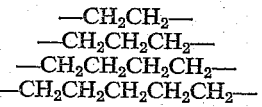

(3)

(4)

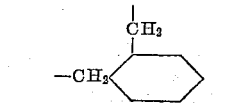

(5)

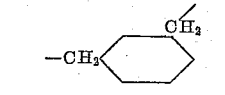

(6)

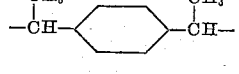

(7)

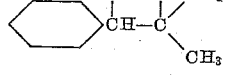

(1)

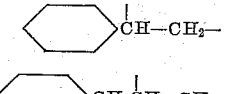

(2)

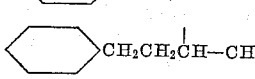

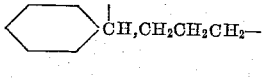

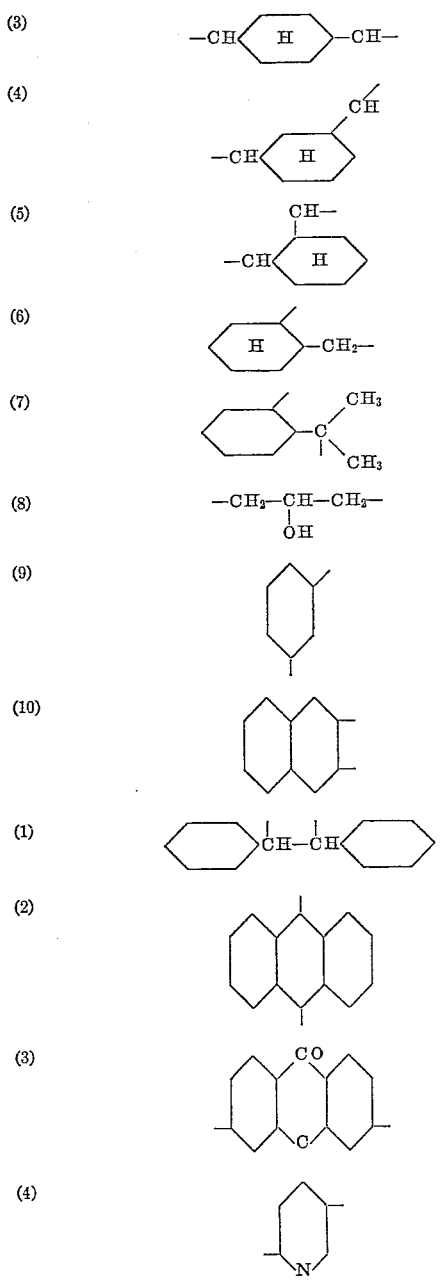

wherein $R_1$ is alkenyl of 3 to 20 carbon atoms, as above, $n$ is the integer 1 or 2, and when $n$ is 1, $R_2$ is alkyl, hydroxy alkyl, haloalkyl, cyanoalkyl, alkoxy alkyl, hydroxyalkoxy alkyl, carbalkoxy alkyl, alkenyl aryl (including substituted aryl), and hetero (including substituted hetero), and when $n$ is 2, $R_2$ is a bridging group such as alkylene, arylene, hetero and the like.

The general method for the preparation of compounds of Formula I involves a condensation of the selected 2-alkenoxy-1-naphthaldehyde with the desired α-cyanoacetic acid ester in the presence of a secondary aliphatic amine such as piperidine as a catalyst. The general reaction of aldehydes with active methylene containing compounds to give methine condensation products upon the elimination of water is well known, and the above described general formula for the preparation of compounds of Formula II is carried out in a similar manner. In addition to piperidine, other bases which may be used may be the following:

> Diethylamine
> Di-n-propylamine
> Cyclohexylamine
> Morpholine
> Diethanolamine, and the like.

The usual procedure involves heating a mixture of the reactants in the presence of the basic catalyst at elevated temperatures until the reaction has gone to completion. A solvent may be employed to effect miscibility of the reactants and when such a solvent is used, the temperature of the reaction will usually be the reflux temperature of the solvent solution of the ingredients. Ethyl alcohol is the preferred solvent in such reaction. In the absence of a solvent, temperatures of the order of 75 to 150° C. may be used. The time of reaction will of course vary depending upon the specific reactants and the temperature used. In some instances a relatively low temperature for a short period of time effects the formation of a substantially quantitative yield of the desired ester. In other cases, longer times and higher temperatures are necessary to get the best yields. It is of course again obvious to one skilled in the art to ascertain for any given combination of reactants the most efficacious combination of temperature and time.

Upon the completion of the esterification reaction, the desired ester is isolated, usually by evaporation of the volatile constituents, namely, water which is liberated in the condensation reaction, any alcohol which may be employed as a solvent, and the basic catalyst where the latter is a liquid and normally and readily removable by distillation or volatilization. It is also possible in certain instances, to isolate the desired ester product by diluting the reaction mixture with a solvent which precipitates out the ester. Thus, methanol may be employed in many cases as such a diluent, and the resultant slurry is then filtered at low temperatures (0 to 5° C.) to separate the crystalline product.

The compounds of the general Formula II above are prepared in a similar manner except that instead of employing cyanoacetic acid derivatives containing a single active methylene grouping, one employs a polycyanoacetate of a polyhydric alcohol using 2 mols of the aldehyde for each mol of the polycyanoacetate, thereby giving rise to the best compounds of Formula II. The polycyanoacetates are, of course, first prepared, and usually in the manner described in U.S. Patent 2,426,056, from the corresponding polyhydric alcohol and cyanoacetic acid in the presence of an acidic catalyst.

The following examples will serve to illustrate the present invention without being deemed limitative thereof.

thereby giving rise to bis-products of the formula:

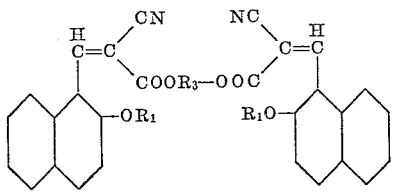

wherein $R_1$ and $R_3$ have the meanings designated above.

Formulas I and II may be combined to yield the following general formula which encompasses the entire genus represented by the said Formulas I and II:

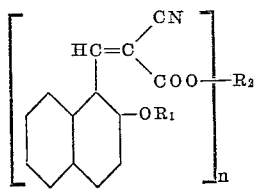

Example 1

Preparation of

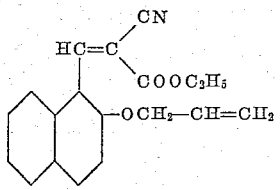

The intermediate 2-allyloxy-1-naphthaldehyde is first prepared according to the following reaction:

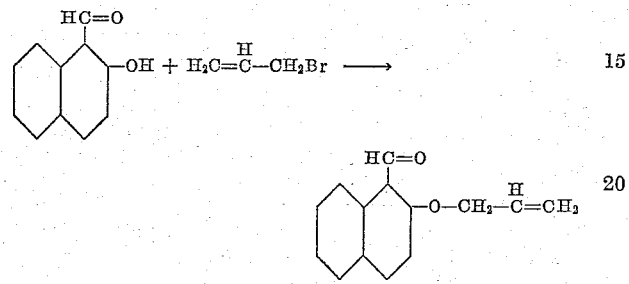

A mixture of 12 gms. 2-hydroxy-1-naphthaldehyde (0.07 mol) 4 gms. potassium, 75 mls. alcohol, and 15 gms. allyl bromide (0.14 mls.) is refluxed 5 hours. The precipitate of potassium bromide is filtered, and the alcohol and excess allyl bromide is distilled from the filtrate. The residue from distillation is treated with sodium hydroxide solution to separate unchanged naphthaldehyde. The residue is further washed with water to give a substantialy pure residue of 2-allyloxy-1-naphthaldehyde.

The 2-allyloxy-1-naphthaldehyde is then condensed with α-cyanoethyl acetate in the following manner. A mixture of 0.37 mol of the naphthaldehyde, 0.37 mol of α-cyanoethyl acetate, and 0.01 mol piperidine is stirred for 75 min. at 90° C. The reaction mixture is then allowed to cool to about 60° C. and then diluted with 120 mls. methanol. The resultant slurry is filtered at 0° C. to separate the crystalline product. The filter cake is washed with methanol and air dried at room temperature. A substantially quantitative yield of the product of the above structural representation is obtained.

Example 2

The procedure of Example 1 is repeated except that the 2-allyloxy-1-naphthaldehyde is condensed with α-cyanomethyl acetate (in an equimolar ratio) to give a substantially quantitative yield of a product having the following formula:

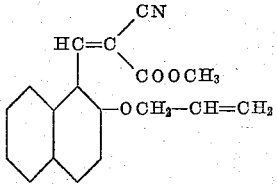

Example 3

Example 1 is once again repeated employing the same aldehyde intermediate which is condensed in the manner of Example 1 with α-cyanotetrahydrofurfuryl acetate (in an equimolar ratio). The latter which has the formula:

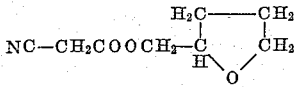

is prepared in the following manner. 170 gms. (2 moles) of cyanoacetic acid is mixed with 22 gms. (cc. moles) of tetrahydrofurfuryl alcohol, 300 mls. chloroform, and 10 gms. of a mixed alkane sulfonic acid catalyst in a 1-liter flask equipped with condenser and water separator. The material is heated under reflux on a steam bath until no more water is taken off. The product is treated with 20% (wt./vol.) sodium hydroxide and washed until neutral to delta paper. The product is extracted with chloroform, dried, solvent removed, and distilled at 140°–144° C. at 0.5 mm. Yield=58%. This intermediate (0.37 mole) is then condensed with 0.37 mole of 2-allyloxy-1-naphthaldehyde in the following manner: A mixture of 0.37 mole of the aldehyde, and 0.37 mole of the intermediate above prepared, with 0.01 mole of piperidine is stirred for 1 hour at 95° C. The reaction mixture is then allowed to cool to 60° C. and diluted with 120 mls. of methanole. A slurry is produced, which slurry is filtered at 3° C. to separate the crystalline product. The filter cake is then washed with 100 mls. of methanole and air dried at room temperature. A substantially quantitative yield of the product of the following formula is obtained:

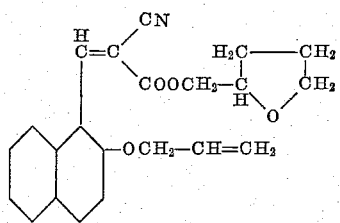

Example 4

Example 1 is once again repeated employing as the aldehyde moiety the same aldehyde of Example 1, which is condensed, however, with α-cyanoglyceryl acetate (in an equimolar ratio) in place of the α-cyanoethyl acetate of Example 1. The mono-glyceryl ester of cyanoacetic ester is prepared as follows:

94 gms. (1 mole) of cyanoacetic acid (90% pure)
184 gms. glycerol (2 moles)
13.9 gms. of toluenesulfonic acid
200 mls. benzene are refluxed together for 24 hours.

The water liberated during the reaction is removed with a water trap [18 mls. (1 mole) of water collected]. The catalyst is neutralized with sodium bicarbonate solution. The material is saturated with NaCl and then extracted with ethyl acetate. The ethyl acetate extract is dried with anhydrous sodium acetate and the solvent is distilled off, leaving the light brown oil of

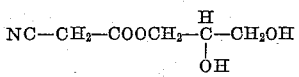

Upon condensation a substantially quantitative yield of a product having the following formula is obtained:

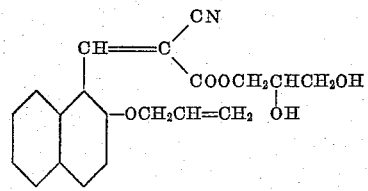

Examples 5–7

Examples 1 through 4 are repeated employing the following aldehydes in lieu of the 2-allyloxy compound of those samples.

| Example | Aldehyde |
| --- | --- |
| 5-a | 2-methallyloxy-1-naphthaldehyde. |
| 5-b | Do. |
| 5-c | Do. |
| 5-d | Do. |
| 6-a | 2-crotyloxy-1-naphthaldehyde. |
| 6-b | Do. |
| 6-c | Do. |
| 6-d | Do. |
| 7-a | 2-decenyl-(2)-oxy-1-naphthaldehyde. |
| 7-b | Do. |
| 7-c | Do. |
| 7-d | Do. |

In the above Examples 5 through 7, *a*, *b*, *c*, and *d* represent repeats of the corresponding Examples 1 through 4.

In the following examples, Example 1 is repeated employing, however, as the cyanoethyl compound, those indicated in lieu of α-cyanoethylacetate (equimolar amounts are used):

*Example 22*

Example 21 is repeated employing 35 moles of ethylene oxide to yield a product containing 35 oxyethyl groups.

*Example 23*

Example 21 is repeated employing 10 moles of propylene oxide to yield a product having 10 oxypropyl groups.

| Example | Cyanoacetate | $R_2$ [of Formula (I)] |
|---|---|---|
| 8 | $CNCH_2COOCH_2CH_2OH$ | $-CH_2CH_2OH$ |
| 9 | $CNCH_2COOCH_2CH_2Cl$ | $-CH_2CH_2Cl$ |
| 10 | $CNCH_2COOCH_2CH_2Br$ | $-CH_2CH_2Br$ |
| 11 | $CNCH_2COOCH_2CH_2CN$ | $-CH_2CH_2CN$ |
| 12 | $CNCH_2COOCH_2CH_2OCH_3$ | $-CH_2CH_2OCH_3$ |
| 13 | $CNCH_2COOCH_2CH_2OCH_2CH_2OH$ | $-CH_2CH_2OCH_2CH_2OH$ |
| 14 | $CNCH_2COOCH_2CH_2OCH_2CH_2COOCH_3$ | $-CH_2CH_2OCH_2CH_2COOCH_3$ |
| 15 | $CNCH_2COOC_6H_5$ | -phenyl |
| 16 | $CNCH_2COOC_6H_4Cl$ | —⟨⟩—Cl |
| 17 | $CNCH_2COOC_6H_4OCH_3$ | —⟨⟩—$OCH_3$ |
| 18 | $CNCH_2COOC_6H_4NHCOCH_3$ | —⟨⟩—$NHCOCH_3$ |
| 19 | $CNCH_2COO$—(naphthyl) | —(naphthyl) |
| 20 | $CNCH_2COOCH_2$—(phenyl) | $-CH_2$—(phenyl) |

In addition to the derivatives above described, condensation products of those compounds containing active hydrogens, and in particular the hydroxy compounds, with an alkylene oxide or a compound functioning as such to yield polyoxyalkylated derivatives, may be used. Examples of alkylene oxides include:

Ethylene oxide
Propylene oxide
Butylene oxide
Butylene dioxide
Cyclohexane oxide
Glycidol
Epichlorohydrin
Butadiene dioxide
Isobutylene oxide
Styrene oxide, and mixtures thereof.

The resulting polyoxylated products may contain from one to 100 oxyalkyl groups.

*Example 21*

The compound of Example 8 is polyoxyalkylated with ethylene oxide in the following manner. To one mole of compound of Example 8 there is first added 1.3% by weight based on the weight of said compound of potassium hydroxide and then 5 moles of ethylene oxide are added while maintaining the mixture in an autoclave at 80° C. The resultant product has the formula:

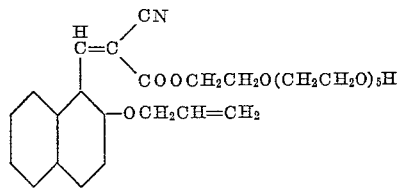

*Example 24*

Example 23 is repeated and then 10 moles of ethylene oxide are further added to give a product containing 10 oxypropyl groups and 10 oxyethyl groups.

*Example 25*

Example 1 is again repeated employing in lieu of 0.37 mole of α-cyanoethylacetate, 0.74 mole of ethylene glycol di(α-cyanoacetate) prepared as described in copending application Serial No. 789,270, filed Jan. 27, 1959, now Patent No. 3,069,456.

*Example 26*

Example 25 is repeated employing, however, 0.74 mole of 1,4-xylyleneglycol di(α-cyanoacetate) [prepared as described in application Serial No. 789,270, now Patent No. 3,069,456] in place of the cyano compound of Example 25.

*Example 27*

Example 25 is again repeated using 0.74 mole of 1-phenyl-2,3-propyleneglycol di(α-cyanoacetate) in place of the cyano compound of that example. The above mentioned copending application describes the preparation of the instant intermediate.

The compounds of this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein.

Of particularly outstanding significance is the use of the compounds herein described in combination with high molecular weight polymers of formaldehyde such as Delrin. The incorporation of from 1 to 5% of the compounds of this invention in such polymers yields an outstanding improvement in the stability of the polymer. It has been determined that at least about a five-fold improvement in stability as manifested by a decrease in crazing and surface cracks is obtained when tested for 30 days in a standard weatherometer. The compounds of this invention may be incorporated in the finished polymer or preferably in the polymerizing mass. Other stabilizers such as the benzothiazoles and the benzophenones cannot be used in this manner since they cause depolymerization.

Another outstanding use of the compounds of this invention lies in the employment thereof in the transparent backings of pressure-sensitive tapes whereby the adhesive is protected against the degradative affects of the environment and particularly of the active radiations. In such use, the compounds may be added to the plastic backing material in the manufacture thereof or impregnated or coated thereon or therein.

Other variations in and modifications of the described processes which will be obvious to those skilled in the art can be made in this invention without departing from the scope or spirit thereof.

We claim:

1. A compound of the formula

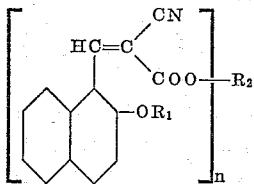

wherein $R_1$ is an alkenyl radical of 3 to 20 carbon atoms, $n$ is an integer from 1 to 2 and when $n$ is 1, $R_2$ is a radical selected from the group consisting of alkyl, alkenyl, hydroxyalkyl, chloroalkyl, bromoalkyl, cyanoalkyl, alkoxyalkyl, hydroxyalkoxyalkyl, carbalkoxyalkyl, phenyl, chloro phenyl, bromo phenyl, alkoxy phenyl, naphthyl, benzyl, and tetrahydro furfuryl and when $n$ is 2, $R_2$ is a radical selected from the group consisting of alkylene, and phenylene radicals.

2. A compound as defined in claim 1 wherein $n$ is 1, and $R_2$ is alkyl.

3. A compound as defined in claim 1 wherein $n$ is 1 and $R_2$ is hydroxy alkyl.

4. A compound of the formula

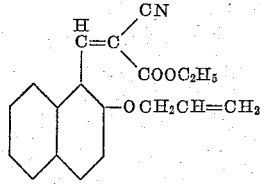

5. A compound of the formula

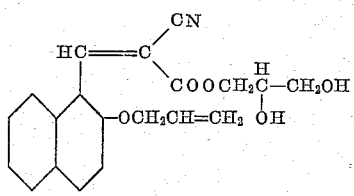

6. A compound of the formula

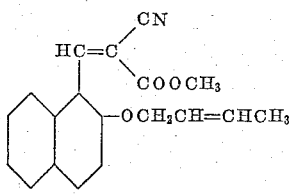

7. A compound as defined in claim 1 wherein $n$ is 1 and $R_2$ is cyanoalkyl.

8. A compound of the formula

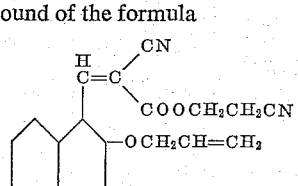

9. A compound as defined in claim 1 wherein $n$ is 2.

10. A compound as defined in claim 8 wherein $R_2$ is —$CH_2CH_2$—.

11. A compound of the formula

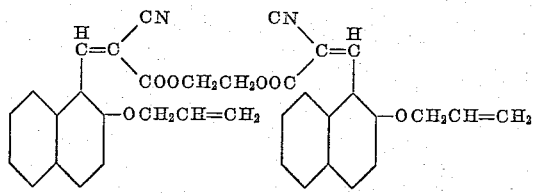

References Cited in the file of this patent

UNITED STATES PATENTS

| | | |
|---|---|---|
| 1,950,421 | Wahl | Mar. 13, 1934 |
| 2,789,125 | Kartinos et al. | Apr. 16, 1957 |
| 2,900,361 | Havens | Aug. 18, 1959 |
| 2,914,551 | Kartinos et al. | Nov. 24, 1959 |

FOREIGN PATENTS

| | | |
|---|---|---|
| 588,864 | Canada | Dec. 15, 1959 |